United States Patent [19]

Widemann et al.

[11] Patent Number: 4,818,219
[45] Date of Patent: Apr. 4, 1989

[54] VAPORIZATION BURNER

[75] Inventors: Friedrich Widemann, Munich; Siegfried Piegsa, Gauting, both of Fed. Rep. of Germany

[73] Assignee: Webasto AG Fahrzeugtechnik, Gauting, Fed. Rep. of Germany

[21] Appl. No.: 177,448

[22] Filed: Apr. 4, 1988

[30] Foreign Application Priority Data

Apr. 22, 1987 [DE] Fed. Rep. of Germany ....... 3713460

[51] Int. Cl.[4] .............................................. F23Q 3/00
[52] U.S. Cl. .................................... 431/261; 431/263; 431/328; 126/116 R
[58] Field of Search ............... 431/261, 263, 284, 333, 431/328, 329; 126/116 R

[56] References Cited

U.S. PATENT DOCUMENTS 3,531,229 9/1970 Berglund ........................ 431/261 X
4,530,658 7/1985 Panick .
4,538,985 9/1985 Zwicker .

FOREIGN PATENT DOCUMENTS 3423940 1/1986 Fed. Rep. of Germany .

Primary Examiner—Randall L. Green
Attorney, Agent, or Firm—Sixbey, Friedman, Leedom & Ferguson

[57] ABSTRACT

A vaporization burner for a heating device operated with liquid fuel, particularly a motor vehicle heating device, has a combustion pipe defining a combustion chamber, and an absorbent body arranged on a carrier, fuel being supplied to the absorbent body via said carrier. At least part of the carrier is not covered by the absorbent body, the uncovered area is provided with a through-opening. An ignition device is arranged behind the carrier and, preferably, extends into an ignition chamber, formed behind the carrier, by an ignition housing having a wall with an opening for supplying combustion air into the ignition chamber. Fuel, which has been vaporized by the absorbent body, reaches the ignition chamber via an opening in a portion of the carrier covered by the absorbent body and forms a combustible mixture. The mixture in the chamber is ignited by means of the ignition device, resulting in a pilot frame which extends through the through-opening in the uncovered area of the carrier. This pilot flame causes ignition of a fuel-air mixture created in the combustion chamber.

20 Claims, 2 Drawing Sheets

VAPORIZATION BURNER

BACKGROUND AND SUMMARY OF THE INVENTION

The invention relates to a vaporization burner for a heating device operated by means of a liquid fuel, particularly for a motor vehicle heating device.

German Patent No. 32 33 321 and corresponding U.S. Pat. No. 4,530,658 disclose a vaporization burner, of the kind mentioned above, which has a combustion chamber within a combustion pipe. The combustion chamber contains an absorbent body disposed on a carrier to which a liquid fuel is supplied. At least part of the side of the carrier facing the combustion chamber is exposed. Furthermore, a combustion air inlet arrangement is provided to prepare a combustion mixture of fuel and air that is ignited by means of an ignition device and burned in the combustion chamber.

German Offenlegungsschrift No. 34 23 940 describes another variation of a vaporization burner for a heating device of the kind initially mentioned, in which the ignition device is an elongated glow plug which transverses the carrier and the absorbent body, projecting above it and extending into the combustion chamber. Still another vaporization burner is disclosed in German Patent No. 32 33 319 and corresponding U.S. Pat. No. 4,538,985, in which a glow ignition device is formed by an essentially flat glow heating body, made of heatable filaments, disposed parallel to the vaporizing surface, immediately in front of the vaporizing body or in the vaporizing body.

In all variations of the vaporization burners described above, the glow device extends into the combustion chamber, thereby exposing it to the high temperatures prevailing therein, causing a reduction in the service life of such a device. Moreover, the fact that the glow device extends into the combustion chamber makes it an impedance to the flow conditions within the combustion chamber itself.

It is, therefore, a primary objective of the invention to create a vaporization burner for a heating device operated with liquid fuel which overcomes the disadvantages described above, and which provides an extended service life for the ignition device, as well as an improvement with respect to the flow conditions in the combustion chamber.

In accordance with the preferred embodiments of the invention, a vaporization burner for a heating device operated with liquid fuel, especially a motor vehicle heating device having a combustion pipe, a combustion chamber in which an absorbent body is disposed on a carrier, to which liquid fuel is supplied and at least part of the side of the carrier facing the combustion chamber is exposed, a combustion air supply device, and an ignition device for the combustion mixture, is provided wherein the ignition device is arranged behind the carrier, i.e., at the side thereof facing away from the combustion chamber. Furthermore, the carrier has at least one opening extending through it that is covered by the absorbent body, in addition to at least one through-opening in the exposed part of the carrier.

Accordingly, in the vaporization burner of the invention, the ignition device is disposed outside of the actual combustion chamber, i.e., behind the carrier for the absorbent body which receives liquid fuel. As a result, the ignition device does not impede the flow conditions in the combustion chamber, thereby resulting in a more favorable combustion process. Moreover, such an arrangement prevents the ignition device from being directly exposed to the high temperatures in the combustion chamber and/or directly to the flame, resulting in a considerably longer service life for the ignition device than has been previously possible. In other words, a vaporization burner is obtained which operates with the utmost reliability, even over a long period of time.

The presence of at least one opening in the part of the carrier that is covered by the absorbent body permits fuel vaporized by the absorbent body to pass directly into the area of the ignition device so that, in combination with the combustion air supplied, an ignitable mixture can be prepared directly in the area surrounding the ignition device. When this mixture is ignited by means of the ignition device, a pilot flame is generated which extends through the through-opening in the exposed part of the carrier. This pilot flame then ignites the fuel-air mixture on the front side of the carrier and the absorbent body (i.e., at the side facing the combustion chamber), thereby initiating the combustion process in the combustion chamber. As is customary, the ignition device is turned off once the combustion is proceeding on its own in the combustion chamber.

Preferably, the ignition device is arranged in a chamber defined by an ignition housing at the rear of the carrier and such housing has at least one combustion air supply inlet which terminates in the ignition chamber formed thereby. It is also preferable that this combustion air supply inlet be opposite the opening in the carrier that is covered by the absorbent body so that the combustion air supplied to the ignition chamber is locally concentrated around the ignition device to promote mixing, in the ignition chamber, of the air with the fuel vaporized by the absorbent body, for the purpose of quickly obtaining a mixing ratio favorable to the ignition process.

Preferably, one housing wall of the ignition chamber is formed by the rear side of the carrier, resulting in a minimum space arrangement for the ignition device with the associated chamber. Further, such a construction facilitates placement of the ignition device in the closest possible proximity to the carrier supporting the absorbent body so that it can be rapidly heated when the ignition device is turned on, thereby promoting fuel vaporization.

In accordance with another aspect of the invention, the ignition device is surrounded by the housing from its free end up to its mounting thread. In this manner, cooling of the ignition device by the combustion air and passing of air into the chamber around the ignition device is prevented.

For reasons of functional efficiency, it has proven beneficial to divide the housing into an outer housing part, representing a separate component and containing the screw thread portion of the ignition device, and an inner housing part which is located in the vicinity of the carrier. Such a design aids in overcoming difficulties caused by variations in manufacturing tolerances, and, more particularly, facilitates direct contact of the outer housing with the ignition device, whereby the ignition device is threadingly engaged with this outer housing part. The inner housing part, on the other hand, has an enlarged interior space to accommodate the premixing of the fuel vapor and combustion air for generating the pilot flame. In order to ensure that the combustion air enters the ignition chamber only via the one combustion air inlet, and to further ensure that no so-called "false air" reaches the chamber, the upper and lower housing parts are sealed at their junction.

For the purpose of reducing sealing difficulties, the vaporization burner and the ignition device, in accordance with another advantageous variation of the invention, are enclosed by a cup-shaped housing part which is connected with the combustion pipe in the chamber by a single flange connection. Also, to avoid sealing problems, the flange is disposed in the plane of a ring of air openings for the supply of combustion air to the combustion pipe.

Appropriately, the flange of the combustion pipe defines a slot-shaped opening for the combustion air, which air is directed to the vaporization burner at a distance from the absorbent body on the carrier, in a direction into the combustion chamber.

In an advantageous manner, the ignition device forms an integrated unit with the cup-shaped housing part, which unit, appropriately, also includes the carrier with the vaporization element so that, if required, all of the elements essential to the functioning of the vaporization burner can be quickly and simply exchanged as a combined unit by removal and replacement of the cup-shaped housing part.

In a further aspect of the invention, the ignition device of the vaporization burner is arranged approximately parallel to the carrier surface. To this end, the ignition device, preferably, is formed by an elongated glow plug.

In accordance with an alternative variation of the invention, the housing surrounding the ignition device can form an integrated unit with the ignition device, and this unit can be removable in a radial direction without disassembly of the heating device. Such an arrangement has an advantage with respect to ease of maintenance.

These and further objects, features and advantages of the present invention will become more obvious from the following description when taken in connection with the accompanying drawings which show, for purposes of illustration only, several embodiments in accordance with the present invention.

DESCRIPTION OF THE PREFERRED EMBODIMENTS

Figure 1:
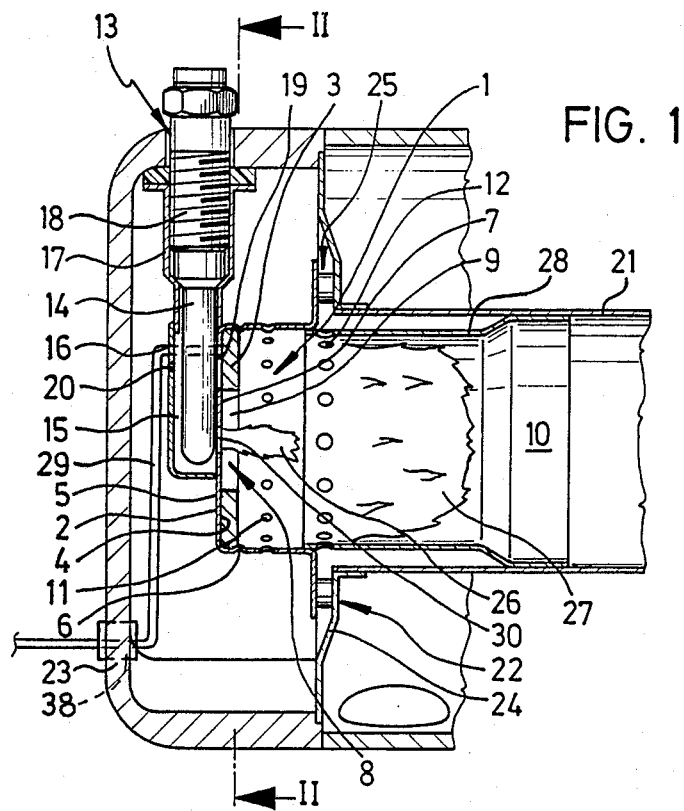
FIG. 1 is a partial longitudinal sectional view of a vaporization burner.
Figure 2:
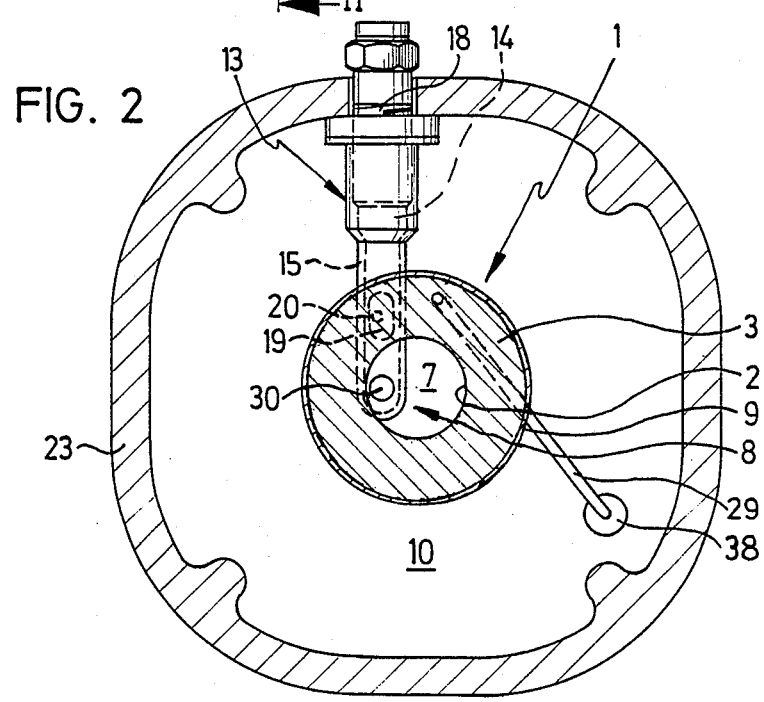
FIG. 2 is a sectional view taken along line II—II in FIG. 1.
Figure 3:
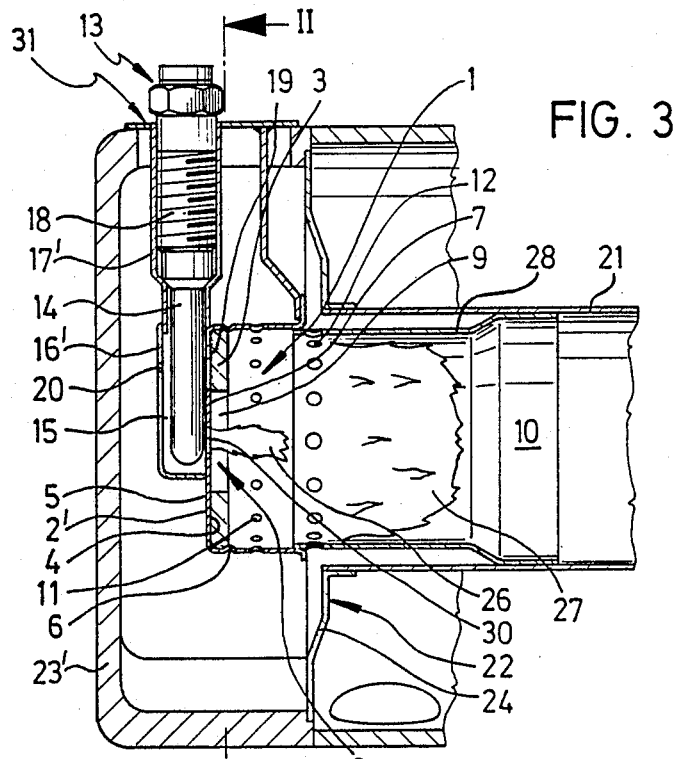
FIGS. 3 and 4 are views corresponding to those of FIGS. 1 and 2, but showing a modified embodiment.
Figure 4:
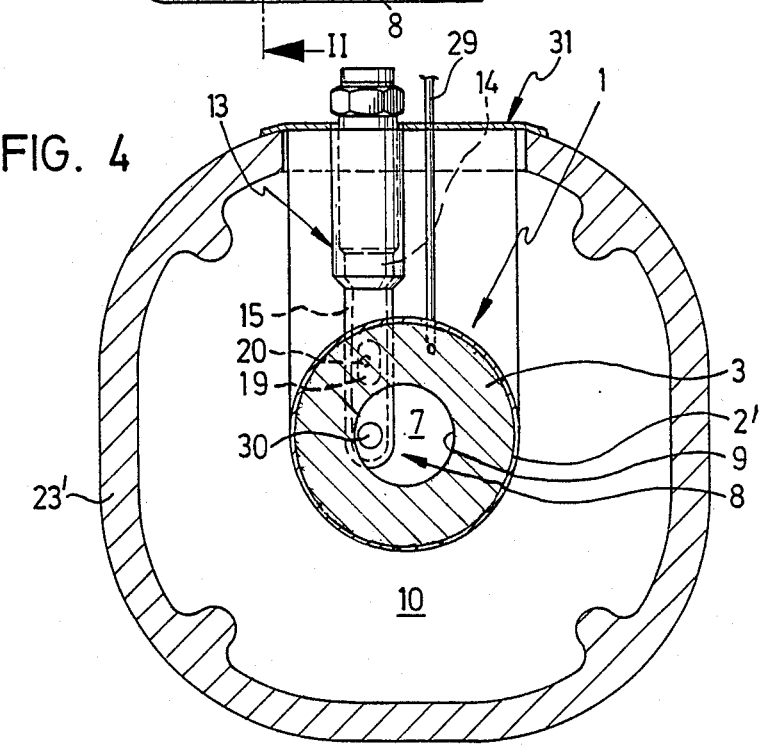

Throughout the Figures, identical components bear identical reference numerals, while components of FIGS. 3 and 4, which correspond to components of FIGS. 1 and 2 in a modified form, are distinguished by a prime (') designation being associated with the like reference numeral. Additionally, the Figures merely show the area of a heating device containing the vaporization burner combustion device. The remaining parts of the heating device may be of any conventional design (for example, as disclosed in the above-mentioned U.S. Pat. No. 4,530,658) and, per se, form no part of the present invention.

Numeral 1 designates a vaporization burner as a whole. Burner 1, in the example depicted, has a carrier 2 for an absorbent body 3. Absorbent body 3 receives liquid fuel that is supplied to carrier 2 via a fuel line 29. The fuel line 29 is passed through a housing part of the heating device by means of a grommet 38. The absorbent body 3 is attached in a conventional manner on the front side 4 of carrier 2 (i.e., the side that faces into a combustion chamber 10), and, in the example depicted, the absorbent body is axially held in place by a constriction 6 in a circumferential wall of the carrier.

In heating devices operated with Diesel fuel, for instance, the absorbent body 3, at least in its middle region 8, has an opening 9 which creates an exposed part 7 on the front side 4 of carrier 2. At a distance from the absorbent body 3, in the direction into combustion chamber 10, there are provided openings 11 and 12 for the passage of combustion air. Openings 11, 12, in the example depicted, are arranged in two spaced concentric rows. Combustion air reaches combustion chamber 10 via these openings 11, 12 by way of a combustion air supply device, not depicted.

An ignition device 13, in the illustrated embodiment, consists of an elongated glow plug, and is disposed in an ignition chamber 15 that is formed at the rear side of carrier 2, i.e., the side facing away from combustion chamber 10. The ignition chamber 15 is defined by an inner ignition housing part 16 and a portion of the rear side 5 of carrier 2. Sufficient clearance exists in ignition chamber 15 relative to the ignition device 13 to prevent a flame extinguishing effect being produced by the inner surface of the ignition chamber 15. The inner housing part 16 is joined by an outer ignition housing part 17 which surrounds ignition device 13, and into which a screw thread 18 of ignition device 13 is inserted. The passage from outer ignition housing part 17 to inner ignition housing part 16 and/or to the rear side 5 of carrier 2 is tightly sealed so that, at this point, no combustion air can enter into ignition chamber 15.

On the rear side 5 of carrier 2, the part of carrier 2 which is covered by the absorbent body 3 has at least one opening 19 through which vaporized fuel may pass. Approximately opposite the opening 19, there is provided a combustion air supply inlet 20 into the inner ignition housing part 16. Additionally, in the exposed portion 7 of carrier 2, there is provided a second through-opening 30. This through-opening 30 leads directly into combustion chamber 10 from the ignition chamber 15. Combustion chamber 10 is circumferentially bounded by a combustion pipe 21 which is connected to cup-shaped housing 23 via a flange connection 22. Housing part 23 supports the ignition device 13, the ignition housing parts 16, 17, as well as carrier 2, with the absorbent body 3. Preferably, the parts mentioned above constitute a single integrated unit. In the area 24 of flange connection 22, a slot-shaped opening 25 is formed for introduction of additional combustion air to combustion chamber 10, for instance, via openings 12. Openings 12 permit a precise distribution of air.

The vaporization burner 1 described above, relative to FIGS. 1 and 2, operates in the manner described below.

With ignition device 13 in operation, liquid fuel is passed via fuel line 29 to absorbent body 3 from a fuel supply device (not shown). This liquid fuel vaporizes and passes through opening 19 of carrier 2 into ignition chamber 15 around ignition device 13. Combustion air is supplied via combustion air supply inlet 20 (by an air supply device such as a blower) and, likewise, enters ignition chamber 15 around the ignition device 13, where it mixes with the vaporized fuel contained therein. When ignition device 13 reaches a predetermined ignition temperature, the mixture thus formed in ignition chamber 15 is ignited, producing a pilot flame 26 which extends toward the combustion chamber 10 via the through-opening 30 in carrier 2. As the fuel from the absorbent body 3 also vaporizes on the front side 4 of the carrier, and, further, a fuel film formed on the exposed part 7 of carrier 2 is heated by the ignition device, an ignitable mixture is also produced in combustion chamber 10 in combination with the combustion air supplied via openings 11, 12. This ignitable mixture is ignited in combustion chamber 10 by way of pilot flame 26. After the combustion of the combustible mixture in chamber 10 has been uniformly continuing for a while, ignition device 13 is turned off, and pilot flame 26 is extinguished.

Inasmuch as ignition device 13 of vaporization burner 1 is located outside combustion chamber 10, the ignition device 13 is not exposed to the high temperatures of combustion chamber 10 or flame 27 in the combustion chamber. This results in a considerably longer service life as well as fewer disturbances of the heating device caused by ignition device 13. Furthermore, since the ignition device 13 does not extend into combustion chamber 10, unimpeded, uniform flow conditions are achieved in combustion chamber 10, resulting in a more favorable combustion process. Moreover, due to the fact that an ignitable mixture can be prepared relatively quickly after start-up in a locally defined area in ignition chamber 15 around the ignition device 13, pilot flame 26 is quickly generated, and ignition device 13 does not have to heat the entire combustion chamber 10 to the required ignition temperature, which results in an energy efficient operation of ignition device 13.

Additionally, sealing problems between combustion chamber 10 or combustion pipe 21, respectively, and the area around carrier 2 are overcome due to the fact that only a single flange connection 22 is disposed between combustion pipe 21, on the plane of one of the rows of openings 11 or 12, and the cup-shaped housing part 23 surrounding the vaporization burner 1. As a consequence of the cup-shaped housing part 23 supporting all elements essential to the operation of the vaporization burner 1, like ignition device 13 and carrier 2 with absorbent body 3, a heating device having such a vaporization burner 1, provides ease of maintenance because only the cup-shaped housing 23 has to be removed and replaced with a corresponding new part, an operation that is quickly and easily performed.

Although not depicted in detail, openings 11, 12 and the combustion pipe insert 28 in which they are formed, may be eliminated, with the consequence that combustion air enters into combustion chamber 10 only via slot-shaped opening 25. It is to be understood, of course, that additional variations are possible in that, for example, flange 24 of combustion pipe 21 may be attached to the heat exchanger of the heater (which is not depicted in detail in the Figures). Depending upon the output required and the corresponding size of ignition device 13 indicated thereby, chamber 15, depicted in the drawing, may also be formed by a trough-like indentation in carrier 2 behind the absorbent body 3. Carrier 2 and the ignition housing parts 16, 17, defining chamber 15, are appropriately, fixedly connected with each other, e.g., by soldering or welding.

As indicated in FIGS. 3 and 4, ignition housing 16', 17' for ignition device 13, can be formed as an integrated unit 31, together with ignition device 13. This unit 31 can be removed for repair, from the cup-shaped housing part 23, in a radial direction, without disassembly of the heating device.

While we have shown and described various embodiments in accordance with the present invention, it is understood that the same is not limited thereto, but is susceptible of numerous changes and modifications as known to those skilled in the art, and we, therefore, do not wish to be limited to the details shown and described herein, but intend to cover all such changes and modifications as are encompassed by the scope of the appended claims.

We claim:

1. Vaporization burner for a liquid fuel heating device having a combustion chamber; a combustion pipe disposed in said combustion chamber; a fuel absorbent body, said absorbent body being arranged on a front side of a carrier that faces the combustion chamber in a manner which leaves at least a portion of said front side exposed; and an ignition device; wherein the ignition device is disposed on a rear side of said carrier which faces away from said combustion chamber; wherein said carrier has at least one opening extending through it in an area of the carrier which is covered by the absorbent body; and wherein at least one through-opening is provided in the exposed portion of the carrier part.

2. Vaporization burner according to claim 1, wherein the ignition device is arranged in an ignition chamber defined by an ignition housing, and wherein the ignition housing has at least one combustion air delivery inlet into said ignition chamber.

3. Vaporization burner according to claim 2, wherein the combustion air delivery inlet is positioned opposite said opening in the area of the carrier which is covered by the absorbent body.

4. Vaporization burner according to claim 3, wherein one of the walls defining the ignition chamber is formed by the rear side of said carrier.

5. Vaporization burner according to claim 2, wherein one of the walls defining the ignition chamber is formed by the rear side of said carrier.

6. Vaporization burner according to claim 4, wherein the ignition housing encloses said ignition device from a free end thereof up to a screw threaded mount thereof.

7. Vaporization burner according to claim 6, wherein said ignition housing is comprised of an inner housing part bounding said ignition chamber and an outer housing part which encloses the ignition device from said chamber to said screw threaded mount and constitutes a separate element from said inner housing part.

8. Vaporization burner according to claim 7, wherein the outer housing part is sealed at a junction between it and the lower housing part which is located in the area of said carrier.

9. Vaporization burner according to claim 8, wherein the vaporization burner further comprises a cup-shaped enclosure housing part in which said ignition device, carrier, ignition chamber, and absorbent body are received.

10. Vaporization burner according to claim 9, wherein the cup-shaped enclosure housing part and the combustion pipe are connected by a single flange connection.

11. Vaporization burner according to claim 10, wherein said combustion pipe is provided with a slot-shaped entrance opening for combustion air.

12. Vaporization burner according to claim 9, wherein the ignition device forms an integrated unit with said cup-shaped housing part.

13. Vaporization burner according to claim 1, wherein the vaporization burner further comprises a cup-shaped enclosure housing part in which said ignition device, carrier, ignition chamber, and absorbent body are received.

14. Vaporization burner according to claim 13, wherein the cup-shaped enclosure housing part and the combustion pipe are connected by a single flange connection.

15. Vaporization burner according to claim 14, wherein said combustion pipe is provided with a slot-shaped entrance opening for combustion air.

16. Vaporization burner according to claim 13, wherein the ignition device forms ah integrated unit with said cup-shaped housing part.

17. Vaporization burner according to claim 4, wherein the ignition device extends approximately parallel to the surface of the carrier covered by said absorbent body.

18. Vaporization burner according to claim 1, wherein the ignition device extends approximately parallel to the surface of the carrier covered by said absorbent body.

19. Vaporization burner according to claim 18, wherein the ignition device is an elongated glow plug.

20. Vaporization burner according to claim 13, wherein the ignition housing and ignition device are formed as an integrated unit which is removable in a radial direction from the cup-shaped enclosure housing part.

* * * * *